(12) United States Patent
Aruga

(10) Patent No.: US 8,079,712 B2
(45) Date of Patent: Dec. 20, 2011

(54) PROJECTOR WITH A POLARIZED LIGHT MODULATION UNIT

(75) Inventor: Susumu Aruga, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 343 days.

(21) Appl. No.: 12/389,063

(22) Filed: Feb. 19, 2009

(65) Prior Publication Data

US 2009/0207380 A1 Aug. 20, 2009

(30) Foreign Application Priority Data

Feb. 20, 2008 (JP) .................................. 2008-038378

(51) Int. Cl.
*G03B 21/14* (2006.01)

(52) U.S. Cl. .......................................... 353/20; 353/30

(58) Field of Classification Search .................. 353/7, 8, 353/20; 359/237, 246, 242, 263, 267
See application file for complete search history.

(56) References Cited

U.S. PATENT DOCUMENTS
7,370,972 B2 * 5/2008 Morikawa et al. .............. 353/20

FOREIGN PATENT DOCUMENTS
JP 06-208089 7/1994

* cited by examiner

*Primary Examiner* — Tony Ko
(74) *Attorney, Agent, or Firm* — Maschoff Gilmore & Israelsen

(57) ABSTRACT

A projector includes a light source unit that emits coherent light, a spatial light modulation unit that modulates the coherent light emitted from the light source unit in accordance with an image signal, and a polarized light modulation unit having a plurality of modulating areas, each of which changing the polarization state of light. The plurality of modulating areas temporally and spatially change the polarization state of the light outputted from the spatial light modulation unit.

6 Claims, 5 Drawing Sheets

PROJECTOR WITH A POLARIZED LIGHT MODULATION UNIT

BACKGROUND

1. Technical Field

The present invention relates to a projector, and particularly to a technology of a projector that uses laser light to display an image.

2. Related Art

A technology using a laser light source as the light source of a projector has been proposed in recent years. A laser light source, as compared with a UHP lamp that has been used as the light source of a projector, has various advantages including excellent color reproducibility, quick start, and a long life. Laser light, which is coherent light, applied onto a screen or any other diffusing surface produces in some cases interference fringes called a speckle pattern having bright and dark dots randomly distributed. A speckle pattern is produced when light beams diffused by the diffusing surface randomly interfere. A speckle pattern recognized in a displayed image gives a viewer a sense of glaring flicker, disadvantageously affecting the viewed image. To avoid such a situation, when a laser light source is used, it is necessary to take measures against speckle noise. To reduce speckle noise, for example, JP-A-6-208089 proposes a technology for superimposing a plurality of speckle patterns by rotating or oscillating a diffuser element. In the technology proposed in JP-A-6-208089, speckle noise is reduced by superimposing a plurality of speckle patterns to make a specific speckle pattern less recognizable.

However, a mechanical driving unit, when necessary to rotate or oscillate the diffusion element, may lower the reliability of the apparatus and make the apparatus less quiet. Further, the diffusion element may be required to be highly durable against the motion of the mechanical driving unit, resulting in increase in cost. In the technology of the related art, it is disadvantageously difficult to reduce speckle noise without using a mechanical driving unit.

SUMMARY

An advantage of some aspects of the invention is to provide a projector capable of effectively reducing speckle noise without using a mechanical driving unit and displaying a high-quality image.

A projector according to an aspect of the invention includes a light source unit that emits coherent light, a spatial light modulation unit that modulates the coherent light emitted from the light source unit in accordance with an image signal, and a polarized light modulation unit having a plurality of modulating areas, each of which changing the polarization state of light. The plurality of modulating areas temporally and spatially change the polarization state of the light outputted from the spatial light modulation unit.

Temporally changing the polarization state of light is defined as follows: Considering a specific position P1 in an image formed by projection light from a projector, the polarization state of light in the specific position P1 changes with time. Spatially changing the polarization state of light is defined as follows: At certain time T1, the polarization state of light in a specific position P1 in an image differs from that in a specific position P2 different from the specific position P1. The polarized light modulation unit temporally and spatially changes the polarization state of light to change a speckle pattern. Speckle noise can be effectively reduced by superimposing a plurality of speckle patterns that have been randomly produced. The projector can use the polarized light modulation unit that changes the polarization state of light to eliminate the need for a mechanical driving unit for reducing speckle noise. A projector capable of effectively reducing speckle noise without using a mechanical driving unit and displaying a high-quality image is thus provided.

It is preferably that the polarized light modulation unit has a liquid crystal device. In the liquid crystal device, the voltage applied to each of the modulating areas is controlled to change the polarization state of light outputted from the liquid crystal device for each of the modulating areas. The polarization state of light can thus be temporally and spatially changed.

It is preferably that the projector further includes a projection system that projects the light modulated by the spatial light modulation unit, and the polarized light modulation unit is provided in the projection system. The above configuration allows the polarization state of the light outputted from the spatial light modulation unit to be changed. Further, disposing the polarized light modulation unit in the projection system allows the projector to be smaller than a case where the polarized light modulation unit is disposed outside the projection system.

It is preferably that the polarized light modulation unit is disposed where an aperture of the projection system is positioned. Positioning the polarized light modulation unit in the aperture in the projection system where the light converges and has the smallest size allows the polarized light modulation unit to be reduced in size. A small polarized light modulation unit also allows the projection system to be smaller than a case where the polarized light modulation unit is not disposed in the aperture but in any other position in the projection system.

It is preferably that the projector further includes a focusing system that forms an intermediate image of an image formed by the spatial light modulation unit, and the polarized light modulation unit is disposed where the intermediate image is positioned. The above configuration allows the polarization state of the light outputted from the spatial light modulation unit to be changed.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Embodiments of the invention will be described below in detail with reference to the drawings.

First Embodiment

Figure 1:
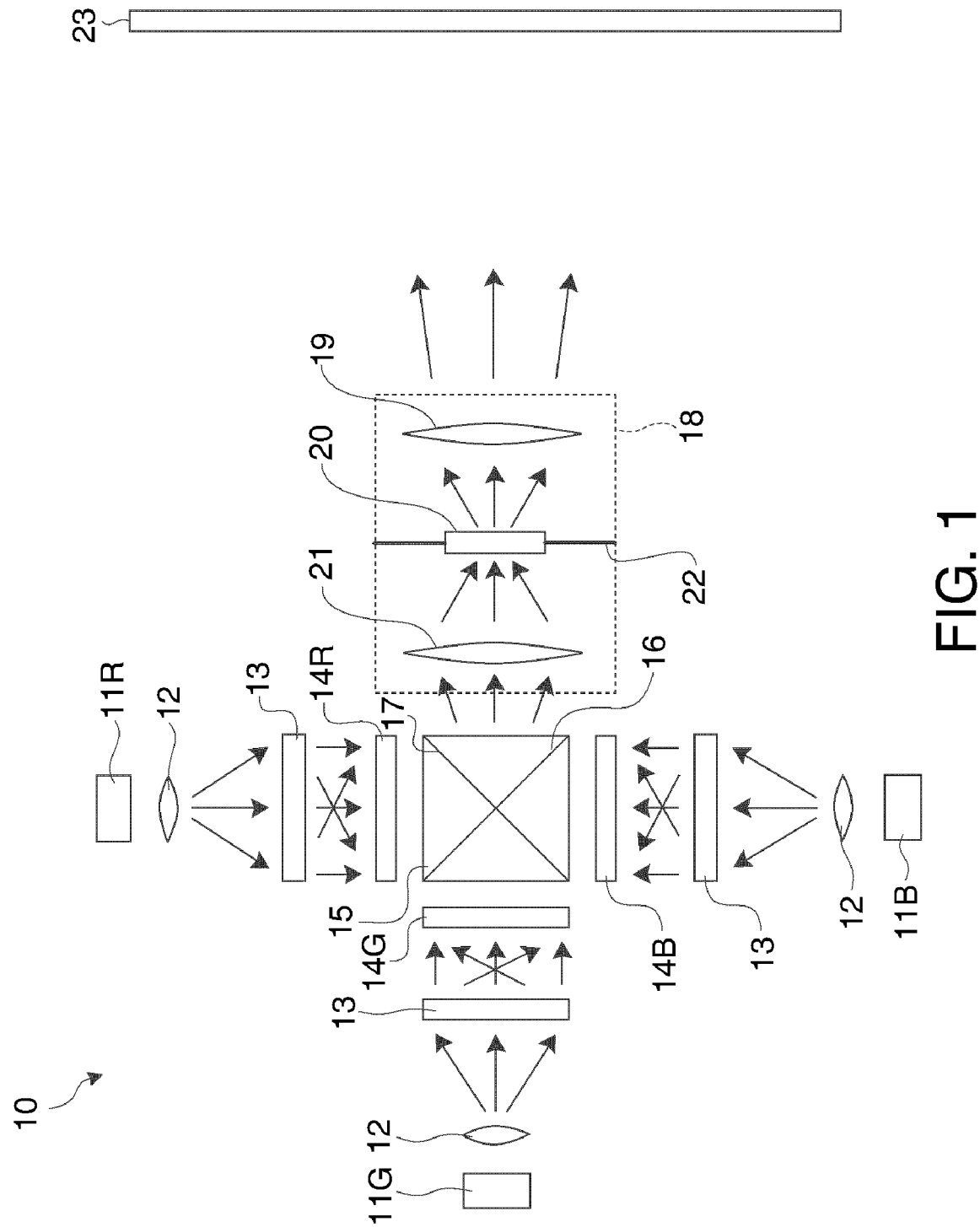
FIG. 1 diagrammatically shows the configuration of a projector according to a first embodiment of the invention.

FIG. 1 diagrammatically shows the configuration of a projector 10 according to a first embodiment of the invention.

The projector 10 is a front-projection projector, which projects light on a screen 23 and presents an image to a viewer who observes the light reflected off the screen 23. A light source apparatus for red (R) light 11R, a light source apparatus for green (G) light 11G, and a light source apparatus for blue (B) light 11B serve as light source units that emit laser light, which is coherent light.

The light source apparatus for R light 11R is a laser light source that emits R laser light and includes a semiconductor laser or any other suitable laser. An enlarging lens 12 enlarges a laser light flux from the light source apparatus for R light 11R. A diffraction optical element 13 diffracts the laser light that has passed through the enlarging lens 12 and outputs the diffracted light. The diffraction optical element 13 shapes and enlarges an illumination area and makes the light intensity distribution uniform in the illumination area. The diffraction optical element 13 is, for example, a computer generated hologram (CGH). A spatial light modulator for R light 14R serves as a spatial light modulation unit that modulates, according to an image signal, the R light that has passed through the diffraction optical element 13. The light modulated by the spatial light modulator for R light 14R is incident on a cross dichroic prism 15.

The light source apparatus for G light 11G is a laser light source that emits G laser light and includes a semiconductor laser or any other suitable laser. A spatial light modulator for G light 14G serves as a spatial light modulation unit that modulates G light according to an image signal after the G light emitted from the light source apparatus for G light 11G has passed through another enlarging lens 12 and diffraction optical element 13. The light modulated by the spatial light modulator for G light 14G is incident on a side of the cross dichroic prism 15 that is different from the side on which the R light is incident.

The light source apparatus for B light 11B is a laser light source that emits B laser light and includes a semiconductor laser or any other suitable laser. A spatial light modulator for B light 14B serves as a spatial light modulation unit that modulates B light according to an image signal after the B light emitted from the light source apparatus for B light 11B has passed through another enlarging lens 12 and diffraction optical element 13. The light modulated by the spatial light modulator for B light 14B is incident on a side of the cross dichroic prism 15 that is different from the sides on which the R light and the G light are incident. Each of the spatial light modulators for the R, G, B light 14R, 14G, 14B is a transmissive liquid crystal display device. An example of the transmissive liquid crystal display device is a high temperature polysilicon (HTPS) TFT liquid crystal panel.

The cross dichroic prism 15 has two dichroic filters 16 and 17 arranged substantially perpendicular to each other. The first dichroic filter 16 reflects the R light and transmits the G and B light. The second dichroic filter 17 reflects the B light and transmits the R and G light. The cross dichroic prism 15 combines the R, G, and B light incident from different directions and directs the combined light toward a projection lens 18. The projection lens 18 is a projection system that projects the light combined in the cross dichroic prism 15 toward the screen 23.

The projection lens 18 is comprised of a front-group lens 19 and a rear-group lens 21. The front-group lens 19 is disposed on the light-exiting side of an aperture 22. The rear-group lens 21 is disposed on the light-incident side of the aperture 22. The front-group lens 19 and the rear-group lens 21 form a telecentric optical system. A principal light ray incident on the rear-group lens 21 becomes substantially parallel to the optical axis of the projection lens 18. The aperture 22 is positioned, for example, at the back focal point of the rear-group lens 21. In the projection lens 18, the light flux that has passed through the rear-group lens 21 converges and has the smallest size at the aperture 22.

A liquid crystal device for modulating polarized light 20 is positioned in the aperture 22 in the projection lens 18. The liquid crystal device for modulating polarized light 20 serves as a polarized light modulator that changes the polarization state of the light outputted from the spatial light modulators for the R, G, B light 14R, 14G, 14B. Positioning the liquid crystal device for modulating polarized light 20 in the aperture 22 in the projection lens 18 where the light flux converges and has the smallest size allows the liquid crystal device for modulating polarized light 20 to be reduced in size. A small liquid crystal device for modulating polarized light 20 also allows the projection lens 18 to be smaller than a case where the liquid crystal device for modulating polarized light 20 is not disposed in the aperture 22 but in any other position in the projection lens 18. It is noted that the front-group lens 19 and the rear-group lens 21 do not necessarily form a telecentric optical system but any other suitable optical system that allows the light flux to be convergent at the position of the aperture 22.

Figure 2:
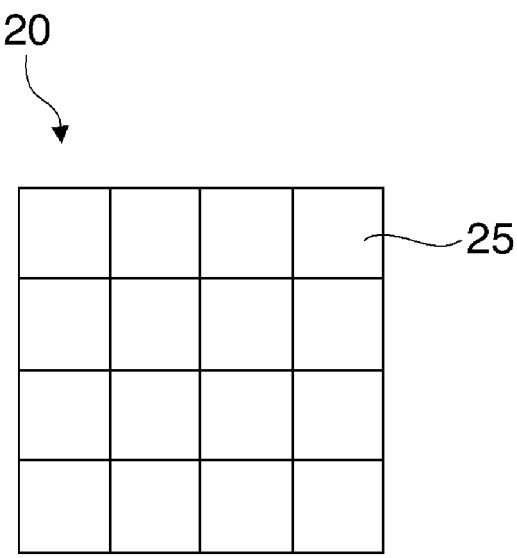
FIG. 2 shows a plan schematic configuration of a liquid crystal device for modulating polarized light.

FIG. 2 shows a plan schematic configuration of the liquid crystal device for modulating polarized light 20. The liquid crystal device for modulating polarized light 20 has 16 modulating areas 25. The modulating areas 25 are disposed in a matrix comprised of 4 vertical areas and 4 horizontal areas. Each of the modulating areas 25 independently changes the polarization state of light.

Figure 3:
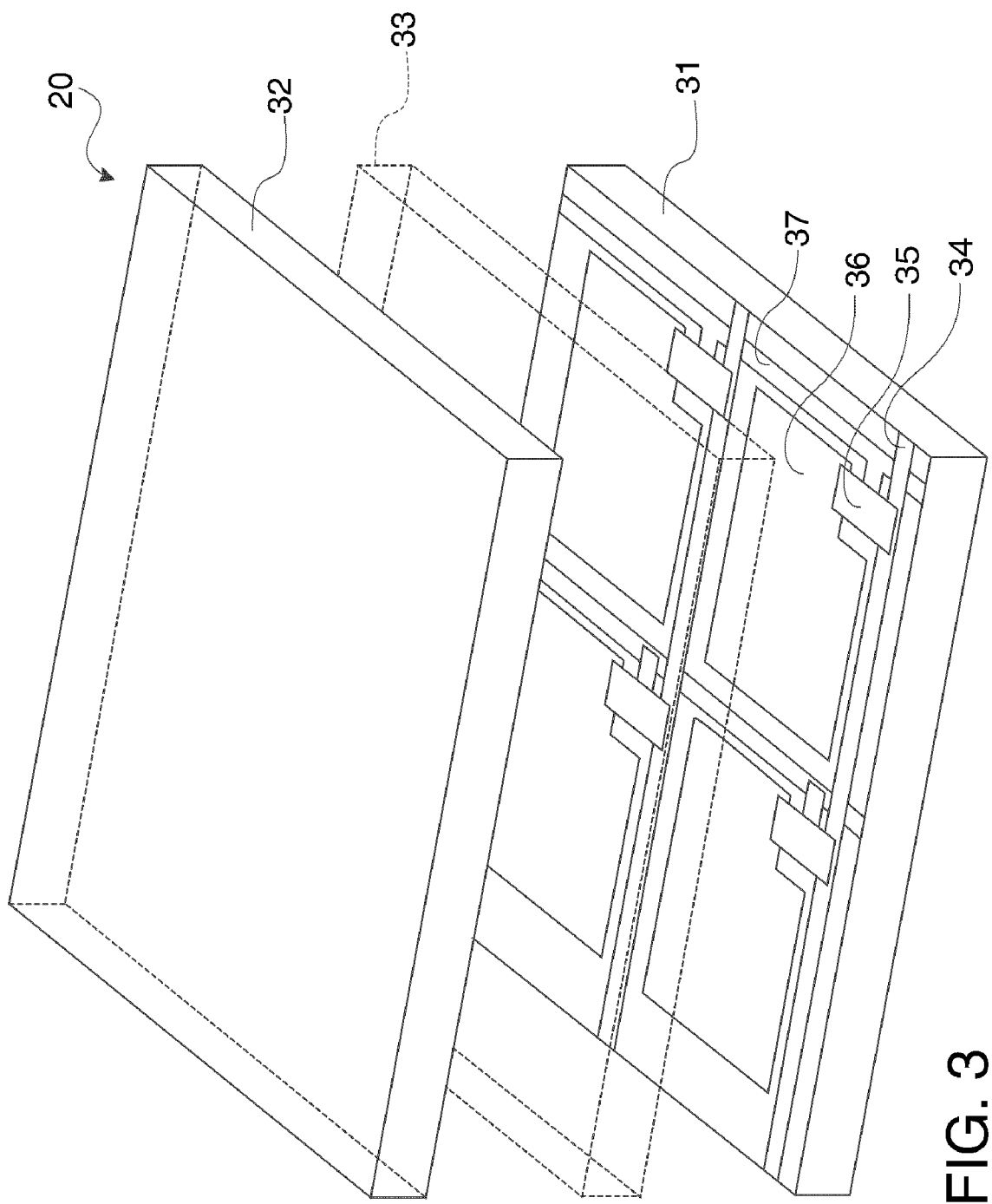
FIG. 3 explains the configuration of a key portion of the liquid crystal device for modulating polarized light.

FIG. 3 explains the configuration of a key portion of the liquid crystal device for modulating polarized light 20. The liquid crystal device for modulating polarized light 20 is configured in such a way that an array substrate 31 and a counter substrate 32 seal a liquid crystal portion 33. The counter substrate 32 is disposed on the side through which light is incident on the array substrate 31. The liquid crystal portion 33 is made of a liquid crystal material comprised of stick-shaped liquid crystal molecules, such as nematic liquid crystals. Thin-film transistors 35 and transparent electrodes 36 are formed in the array substrate 31. Transparent electrodes (now shown) are formed on the counter substrate 32 at positions corresponding to the transparent electrodes 36 in the array substrate 31 with the liquid crystal portion 33 interposed therebetween. The liquid crystal device for modulating polarized light 20 transmits light through the areas where the transparent electrodes 36 are provided. The portions of the liquid crystal device for modulating polarized light 20 that transmit light form the modulating area 25 shown in FIG. 2. FIG. 3 shows the portion of the liquid crystal device for modulating polarized light 20 where four modulating areas 25 are provided.

An orientation layer (not shown) that has undergone a predetermined orientation process, such as rubbing, is provided on one side of each of the transparent electrodes in the counter substrate 32, the one side facing the liquid crystal portion 33, and one side of each of the transparent electrodes 36 in the array substrate 31, the one side facing the liquid crystal portion 33. Each of the orientation layers in the counter substrate 32 and the corresponding orientation layer in the array substrate 31 are disposed in such a way that the rubbing directions of the orientation layers are perpendicular to each other. In this case, the liquid crystal molecules in the liquid crystal portion 33 are held in such a way that the major axis direction of the liquid crystal molecules close to the counter substrate 32 is twisted by 90 degrees with respect to that of the liquid crystal molecules close to the array substrate 31.

Signal lines 34 and scan lines 37 are provided in the array substrate 31. Each of the signal lines 34 is connected to the sources of the corresponding thin-film transistors 35. Each of the scan lines 37 is connected to the gates of the corresponding thin-film transistors 35. The liquid crystal device for modulating polarized light 20 is driven in an active matrix scheme in which the voltage applied to the liquid crystal portion 33 via the thin-film transistor 35 provided in each of the modulating areas 25 is adjusted for each of the modulating areas 25. Polarizers are provided on both the light-incident and light exiting sides of each of the transmissive liquid crystal display devices used as the spatial light modulators for the R, G, B light 14R, 14G, 14B, whereas the liquid crystal device for modulating polarized light 20 requires no polarizer.

When the voltage application to the liquid crystal portion 33 is terminated, the liquid crystal molecules between the counter substrate 32 and the array substrate 31 are oriented in such a way that the major axis of the liquid crystal molecules is substantially parallel to the counter substrate 32 and the array substrate 31 and the liquid crystal molecules are uniformly twisted. In this case, the oscillation plane of linearly polarized light incident on the liquid crystal portion 33 rotates in accordance with the orientation state of the liquid crystal molecules. The polarization state of the linearly polarized light changes when the light is incident on the liquid crystal portion 33 and the oscillation plane of the light is rotated. When a maximum voltage is applied to the liquid crystal portion 33, the major axis of the liquid crystal molecules becomes parallel to the electric field applied to the liquid crystal portion 33. In this case, the light incident on the liquid crystal portion 33 exits therefrom with its polarization state substantially unchanged. In the liquid crystal device for modulating polarized light 20, the voltage applied to the liquid crystal portion 33 is adjusted within the range from zero to the maximum voltage to change the orientation state of the liquid crystal molecules as appropriate and hence adjust the polarization state of light. In the liquid crystal device for modulating polarized light 20, the applied voltage is adjusted for each of the modulating areas 25 to adjust the polarization state of light for each of the modulating areas 25.

The liquid crystal device for modulating polarized light 20 does not necessarily employ the configuration in which each of the orientation layers in the counter substrate 32 and the corresponding orientation layer in the array substrate 31 are provided in such a way that the rubbing directions of the orientation layers are perpendicular to each other, but the orientation layers may be provided in such a way that the rubbing directions are parallel to each other. In this case, when the voltage application to the liquid crystal portion 33 is terminated, the major axis of the liquid crystal molecules becomes parallel to the rubbing direction. In this case, when linearly polarized light whose oscillation plane is inclined to the major axis of the liquid crystal molecules is incident on the liquid crystal portion 33, the oscillation plane of the linearly polarized light can be rotated.

Figure 4:
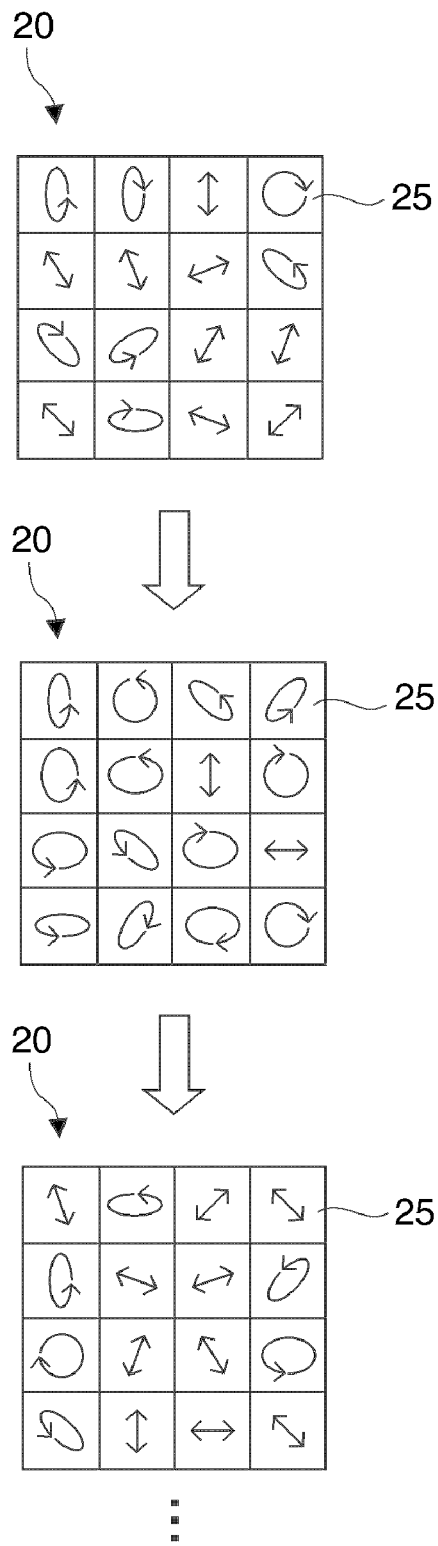
FIG. 4 explains how the liquid crystal device for modulating polarized light adjusts the polarization state of light.

FIG. 4 explains how the liquid crystal device for modulating polarized light 20 adjusts the polarization state of light. The light outputted from each of the spatial light modulators for the R, G, B light 14R, 14G, 14B is linearly polarized light having a specific oscillation direction. The liquid crystal device for modulating polarized light 20 uses optical rotation, which is one of the properties of liquid crystal, to rotate the oscillation plane of linearly polarized light. The liquid crystal device for modulating polarized light 20 outputs linearly polarized light whose oscillation direction is adjusted in accordance with how much the oscillation plane of the linearly polarized light is rotated. In FIG. 4, a double-headed arrow indicates that linearly polarized light will be outputted. The orientation of a double-headed arrow indicates the oscillation direction of the linearly polarized light.

The liquid crystal device for modulating polarized light 20 uses birefringence, which is one of the properties of liquid crystal, to retard the phase of linearly polarized light having a predetermined oscillation direction. The liquid crystal device for modulating polarized light 20 imparts a phase difference to linearly polarized light components whose oscillation directions are perpendicular to each other to output circularly polarized light or elliptically polarized light. In FIG. 4, a circular arrow indicates that circularly polarized light will be outputted, and an elliptical arrow indicates that elliptically polarized light will be outputted. Any of circularly polarized light and elliptically polarized light is dextrorotary or levorotary in accordance with the imparted phase difference. The aspect ratio of the ellipse of elliptically polarized light changes in accordance with the deviation between the linearly polarized light components.

The liquid crystal device for modulating polarized light 20 temporally and spatially changes the polarization state of the light outputted from each of the spatial light modulators for the R, G, B light 14R, 14G, 14B by temporally changing the voltage applied to a plurality of modulating areas 25 in the liquid crystal portion 33. The change in polarization state of light used herein refers to all the following changes: change to linearly polarized light, circularly polarized light, and elliptically polarized light, change in oscillation direction in the case of linearly polarized light, change in rotation direction in the case of circularly polarized light, and change in rotation direction and change in aspect ratio of the ellipse in the case of elliptically polarized light. The change in polarization state of light also refers to a case where the polarization state of light outputted from any of the modulating areas 25 is temporarily the same as the polarization state of light at the time of incidence on the liquid crystal device for modulating polarized light 20.

Temporally changing the polarization state of light is defined as follows: Considering a specific position P1 in an image formed by projection light from the projector 10, the polarization state of light in the specific position P1 changes with time. Spatially changing the polarization state of light is defined as follows: At certain time T1, the polarization state of light in a specific position P1 in an image differs from that in a specific position P2 different from the specific position P1. It is noted that the polarization states of light outputted from the modulating areas 25 do not necessarily differ from one another at all timings, but two or more modulating areas 25 may output light whose polarization states are the same at a certain timing. To effectively reduce speckle noise, the liquid crystal device for modulating polarized light 20 is desirably configured in such a way that the modulating areas 25 successively swap a plurality of specific polarization states and the polarization states are randomly changed.

The liquid crystal device for modulating polarized light 20 thus uses a plurality of modulating areas 25 to temporally and spatially change the polarization state of light to change a speckle pattern. Superimposing a plurality of speckle patterns that have been randomly produced allows speckle noise to be effectively reduced. The projector 10 uses the liquid crystal device for modulating polarized light 20 that changes the polarization state of light to eliminate the need for a mechanical driving unit for reducing speckle noise. Such a configuration advantageously allows speckle noise to be effectively reduced without using a mechanical driving unit and a high-quality image to be displayed.

The liquid crystal device for modulating polarized light 20 desirably switch one polarization state of light to another, for example, at a frequency of 60 Hz or faster. In this way, a specific speckle pattern can be changed faster than a viewer recognizes the speckle pattern to reduce speckle noise effectively. The liquid crystal device for modulating polarized light 20 is not necessarily driven in an active matrix scheme, but may be driven in a passive matrix scheme. When a passive matrix driving scheme is employed, the thin-film transistors 35, the signal lines 34, and the scan lines 37 are replaced with a plurality of electrodes formed in such a way that the electrodes in the array substrate 31 are oriented perpendicular to the electrodes in the counter substrate 32. In this case, the simple configuration for adjusting the voltage for each of the modulating areas 25 can simplifies the configuration of the liquid crystal device for modulating polarized light 20, whereby manufacturing cost can be advantageously reduced. When an active matrix driving scheme is employed, liquid crystal response time can be shorter than that in a case where a passive matrix driving scheme is employed.

The liquid crystal device for modulating polarized light 20 does not necessarily have 16 modulating areas 25, but may have any plurality of modulating areas 25. The number of modulating areas 25 can be determined as appropriate as long as speckle noise can be effectively reduced. The liquid crystal device for modulating polarized light 20, when having a fewer number of modulating areas 25, can advantageously not only be more readily manufactured but also reduce loss of light incident on the portions where the thin-film transistors 35 and other components are provided. The liquid crystal device for modulating polarized light 20, when having a greater number of modulating areas 25, can advantageously change a speckle pattern randomly and hence reduce speckle noise effectively.

The liquid crystal device for modulating polarized light 20 is not necessarily positioned in the aperture 22 in the projection lens 18. The liquid crystal device for modulating polarized light 20 may be disposed in a position in the projection lens 18 that is different from the position of the aperture 22. For example, the liquid crystal device for modulating polarized light 20 may be disposed in the pupil position of the projection lens 18. Disposing the liquid crystal device for modulating polarized light 20 in the projection lens 18 allows the projector 10 to be advantageously smaller than a case where the liquid crystal device for modulating polarized light 20 is disposed outside the projection lens 18. Further, the liquid crystal device for modulating polarized light 20 is not necessarily provided in the projection lens 18. The liquid crystal device for modulating polarized light 20 may be disposed in any position as long as it is within the optical path of light outputted from the spatial light modulators for the R, G, B light 14R, 14G, 14B.

As in the present embodiment, when the light beams from the spatial light modulators for the R, G, B light 14R, 14G, 14B are combined in the cross dichroic prism 15, the liquid crystal device for modulating polarized light 20 is desirably disposed on the light-exiting side of the cross dichroic prism 15. This configuration allows the single liquid crystal device for modulating polarized light 20 to change the polarization states of the respective color light beams. The liquid crystal device for modulating polarized light 20 can effectively reduce speckle noise not only when only linearly polarized light having a specific oscillation direction is incident, but also when, for example, light having random polarization states is incident by changing the polarization state.

The projector 10 does not necessarily use transmissive liquid crystal display devices as the spatial light modulators. Examples of the spatial light modulator may include a reflective liquid crystal display device (LCOS: Liquid Crystal On Silicon), a DMD (Digital Micromirror Device), and a GLV (Grating Light Valve). The projector 10 is not necessarily configured to have a spatial light modulator for each color. The projector 10 may be configured to have one spatial light modulator that modulates two, three or more color light beams. The projector 10 does not necessarily use a spatial light modulator. The projector 10 may be a slide projector using a slide carrying image information. The projector 10 may be what is called a rear projector, which supplies light onto one side of a screen and presents an image to a viewer who observes the light that exits through the other side of the screen.

Second Embodiment

Figure 5:
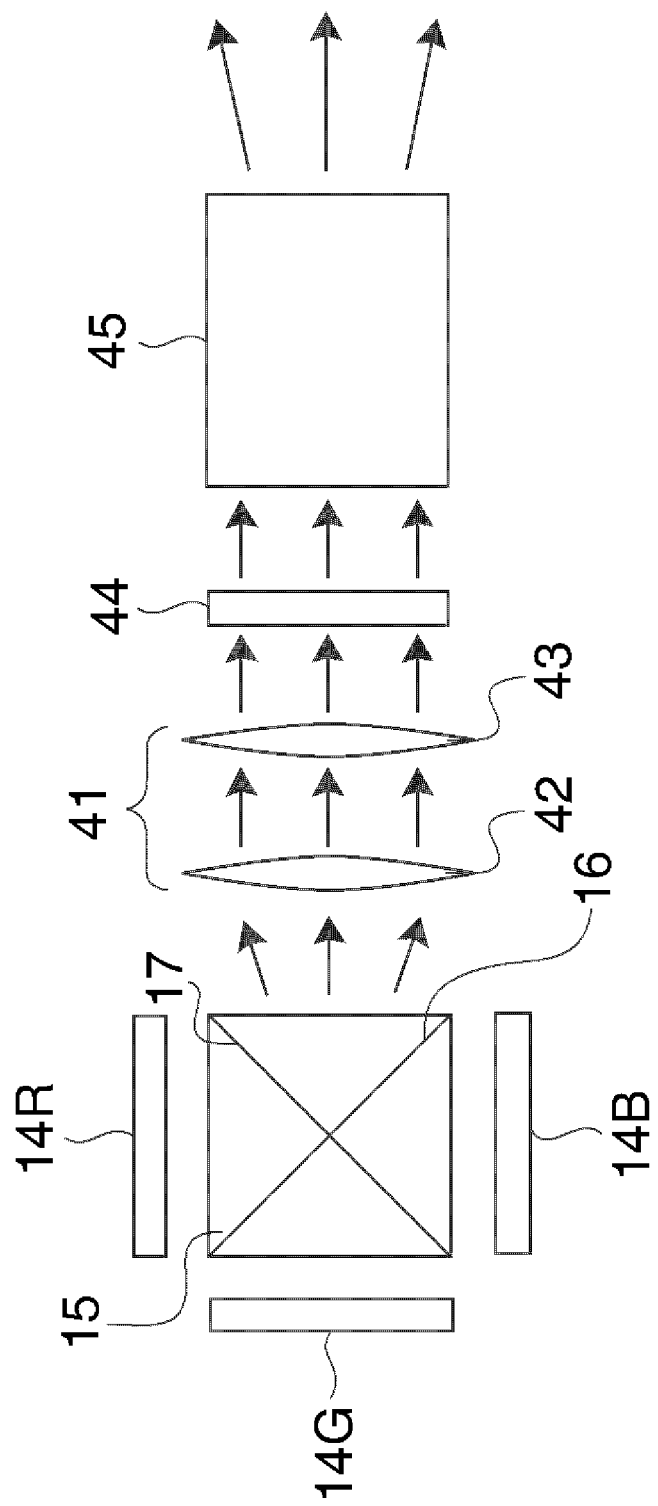
FIG. 5 diagrammatically shows a characteristic portion of a projector according to a second embodiment of the invention.

FIG. 5 diagrammatically shows a characteristic portion of a projector according to a second embodiment of the invention. The present embodiment is characterized in that a liquid crystal device for modulating polarized light 44 is disposed where an intermediate image is positioned. The same portions as those in the first embodiment have the same reference characters and redundant description thereof will be omitted. A focusing system 41 and the liquid crystal device for modulating polarized light 44 are provided within the optical path between the cross dichroic prism 15 and a projection lens 45. The focusing system 41 has a first lens 42 and a second lens 43. The focusing system 41 forms an intermediate image of the image formed by the spatial light modulators for the R, G, B light 14R, 14G, 14B.

The first lens 42 and the second lens 43 form a telecentric optical system. The principal light ray incident on the first lens 42 becomes substantially parallel to the optical axis of the projection lens 45. The principal light ray that has exited from the second lens 43 becomes substantially parallel to the optical axis of the projection lens 45. The liquid crystal device for modulating polarized light 44 is disposed where the intermediate image formed by the focusing system 41 is positioned. The liquid crystal device for modulating polarized light 44 serves as a polarized light modulator that uses a plurality of modulating areas 25 (see FIG. 2) to temporally and spatially change the polarization states of light outputted from the spatial light modulators for the R, G, B light 14R, 14G, 14B. The liquid crystal device for modulating polarized light 44 has the same configuration as that of the liquid crystal device for modulating polarized light 20 in the first embodiment (see FIGS. 2 and 3) except for the position where the liquid crystal device for modulating polarized light 44 is disposed. The projection lens 45 is a projection system that projects the light from the liquid crystal device for modulating polarized light 44 toward a screen (not shown).

The present embodiment also allows speckle noise to be effectively reduced without using a mechanical driving unit and a high-quality image to be displayed. The focusing system 41 is not necessarily a telecentric optical system, but may be any other optical system as long as it can form an intermediate image.

In each of the above embodiments, the light source unit does not necessarily include a semiconductor laser, but may include a solid-state laser, a liquid laser, a gas laser, or any other suitable laser. The projector does not necessarily use a laser light source as the light source unit. The projector may have a configuration using a light emitting diode (LED), a super-luminescence diode (SLD), or other solid-state light sources as the light source unit.

The entire disclosure of Japanese Patent Application No. 2008-38378, filed Feb. 20, 2008 is expressly incorporated by reference herein.

What is claimed is:

1. A projector comprising:
    a light source unit that emits coherent light;
    a spatial light modulation unit that modulates the coherent light emitted from the light source unit in accordance with an image signal; and
    a polarized light modulation unit having a plurality of modulating areas, each of which changing the polarization state of light, the polarized light modulated unit including a liquid crystal device which includes an array electrode and a counter electrode formed on either side of a liquid crystal portion,
    wherein the plurality of modulating areas temporally and spatially change the polarization state of the light outputted from the spatial light modulation unit.

2. The projector according to claim 1, further comprising a projection system that projects the light modulated by the spatial light modulation unit.

3. The projector according to claim 2, wherein the polarized light modulation unit is provided in the projection system.

4. The projector according to claim 3, wherein the polarized light modulation unit is disposed where an aperture of the projection system is positioned.

5. The projector according to claim 1, further comprising a focusing system that forms an intermediate image of an image formed by the spatial light modulation unit.

6. The projector according to claim 5, wherein the polarized light modulation unit is disposed where the intermediate image is positioned.

* * * * *